April 19, 1966 LE ROY H. EASTON 3,246,538
CASING
Filed Oct. 29, 1963 2 Sheets-Sheet 1

INVENTOR.
LEROY H. EASTON
BY Philip D. Golrick
ATTORNEY

April 19, 1966 LE ROY H. EASTON 3,246,538
CASING
Filed Oct. 29, 1963 2 Sheets-Sheet 2
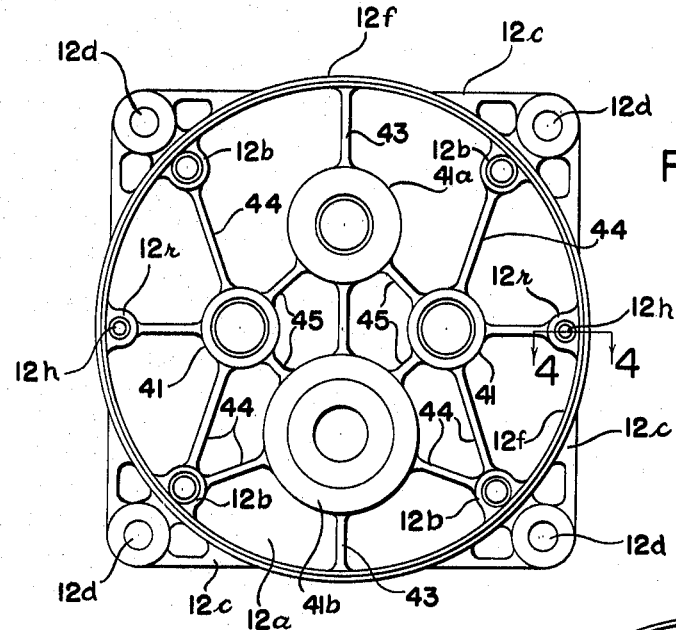
FIG. 2
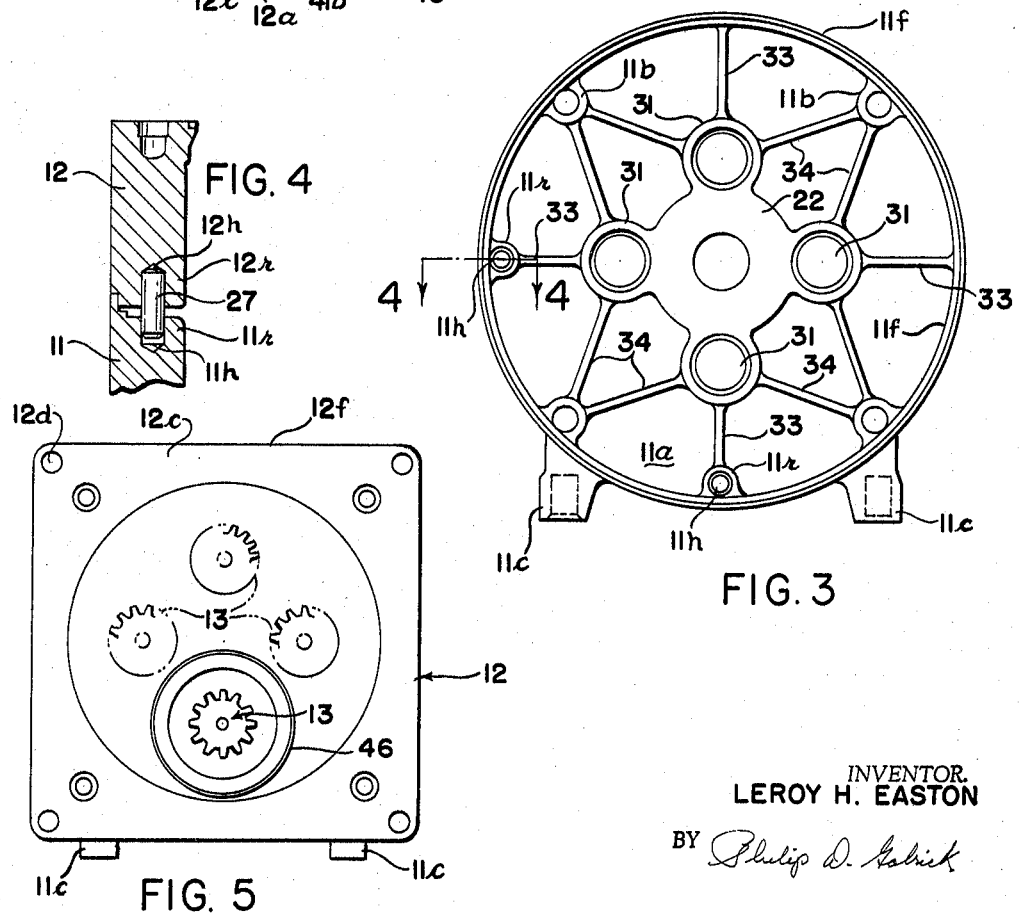
FIG. 3
FIG. 4
FIG. 5
INVENTOR.
LEROY H. EASTON
BY Philip D. Gabrick
ATTORNEY

United States Patent Office 3,246,538
Patented Apr. 19, 1966

3,246,538
CASING
LeRoy H. Easton, Cuyahoga Falls, Ohio, assignor to Ametek, Inc., New York, N.Y., a corporation of Delaware
Filed Oct. 29, 1963, Ser. No. 319,723
12 Claims. (Cl. 74—606)

The present invention is concerned generally with a casing arrangement for supporting and enclosing a gearing train; and more particularly with an improvement in a gear casing and supporting structure providing a ready selectability of the position of an output shaft parallel to but offset from an input shaft.

It is the general object of the present invention to provide a casing and supporting structure for gearing which affords in a relatively simple construction a selectability for orientation of an output shaft among positions parallel to but offset from an input shaft. The invention, hereinafter disclosed in one specific embodiment, in attaining this end advantageously permits not only changes in such orientation subsequent to initial manufacture, but also fabrication of just one type of casing parts, from which units may be assembled without specially machining each part for a specific desired shaft orientation.

Other objects and advantages will appear from the following description and the drawings wherein:

FIG. 2 is an end elevational view of one member of the casing member showing its inside face;

FIG. 3 is a similar elevational view of another casing member;

FIG. 4 is a fragmentary detailed view in section taken at the line 4—4 in FIG. 2; and FIG. 5 is a schematic representation of the four output shaft positions here possible relative to the base 11c.

Figure 1:
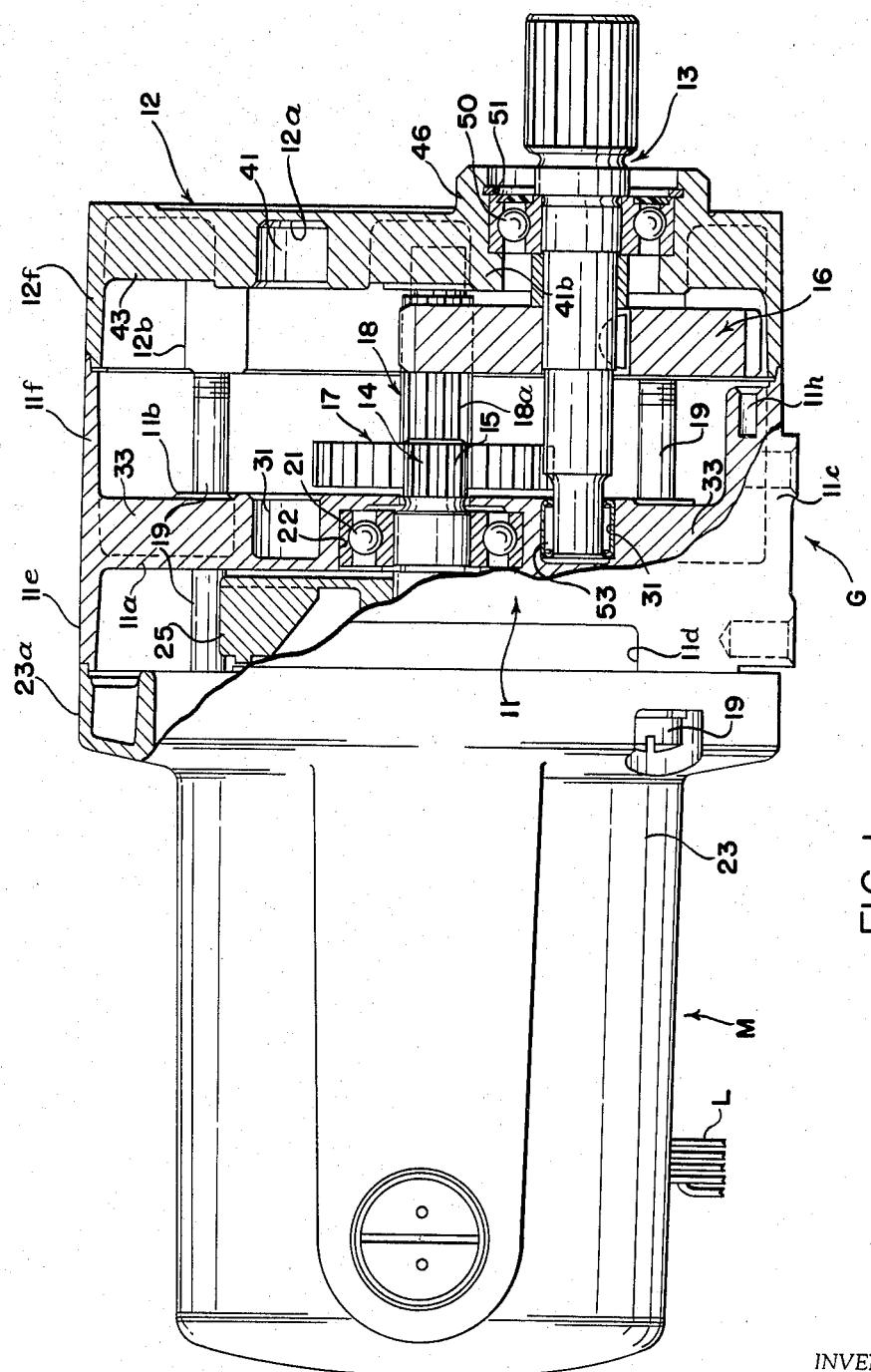
FIG. 1 is a side view of a gear motor unit embodying the present invention partly in elevation and partly in vertical longitudinal section.

In the drawings, one form of the invention is shown embodied in a gear-motor unit including a motor section M and a gearing section G.

The gearing section G includes casing members 11 and 12; an outwardly projecting output shaft 13 thereby supported as hereinafter described in parallel and radially offset relation to an input shaft 14 extending through and at least in part supported in the casing member 11; and suitable gearing, such as input gear 15 on the input shaft 14, gear 16 keyed to output shaft 13, and the gear 17 meshed with 15 and fixed on the rotatable supporting shaft 18 having formed thereon gear teeth 18a in mesh with the output gear 16.

Here the general structure of the motor unit M is not per se part of the present invention; but as to the motor frame or housing it is noted that the generally cylindrical casing member 11 also serves as an end bracket for the motor M, that is, forms a right end closure for the motor main housing member 23 and supports the right end of the motor shaft as the gearing section input shaft 14 at central location through a ball bearing unit 21 received in a bearing socket 22 in the casing end wall or partition 11a. For this purpose a cylindrically flanged formation 11e is fitted into, or has fitted thereon, a mating portion of a main motor housing member 23 by virtue of the respectively internally and externally rabbeted interfitting edge portions; the four screws or bolts 19, passed through aligned apertures in the members 11 and 23 and threaded into corresponding threaded bosses 12b on the interior of a rim or flange portion 12f of member 12, for securing the members in selected orientation. The bosses and apertures are respectively equi-angularly spaced at equal radii about the axis of the system, that of the motor or input shaft; so that a motor housing including an outlet for the motor power leads may readily be changed, among any selected one of four right angle displaced positions, relative to the casing base or foot formations 11c. For completeness of description, it is noted that the motorward flange 11e has cutouts 11d for discharge of motor ventilating air drawn through the motor casing by a centrifugal fan 25 on the motor shaft.

In the gear casing unit proper, a cylindrical flange 11f is mated and fitted with the flange 12f of the member 12, as in the case of the motor joint; and in cover-like fashion the member 12 is secured on the member 11 by the bolts 19 as above described. The two members 11 and 12 are secured in precise selected angular orientation as shown in FIG. 4 by pin 27 received in cooperating alignable blind holes 11h, 12h spaced as hereinafter described.

Also the member 12, by virtue of perforated ears or lugs 12c at its right end extending outwardly in flange-like fashion with coplanar outer faces, forms a mounting plate by which the unit may be secured to other equipment to be driven, by bolts passed through the lug apertures 12d.

The casing member 11 as an integral cast structure is then comprised of the generally cylindrical wall portion constituted of the oppositely extending flanges 11e, 11f with tapped external feet 11c projecting therefrom as a mounting base; the transverse centrally apertured wall or web portion 11a; the socket cup formation 22 open toward the motor side for receiving the motor shaft bearing 21 (see FIG. 3) and extending rearwardly into the gear chamber from wall 11a; four identical gearing shaft receiving sockets 31 machined in bosses on the gear chamber face of wall 11a at 90° spacing from each other and equi-radially spaced from the axis of the input shaft, with cylindrical walls of the sockets merging into that of socket 22; the through-bored bosses of 11b on the gear case face through which the securing bolts 19 extend; and likewise on the gear case face, the strengthening ribs 33 running radially from respective sockets 31 out to the rim or flange 11f, and the angularly running strengthening ribs 34 running from sockets 31 to bosses 11b.

It will be noted also that two of the sucessive radial ribs join the flange 11f near the foot of ribs 11r on the inner face of flange 11f running from wall 11a substantially out to the rabbeted edge of flange 11f and are provided with the holes 11h for an aligning pin selection location.

Thus it will be noted that as viewed from the gearing chamber side, with the exception of the location of the feet 11c and the holes 11h, this casing member has a four-position rotational symmetry relative to its center or the axis of the unit.

The casing end member 12 on the inner face of its end wall or partition 12a is similarly provided with four equi-spaced bosses 12b running out on the inner face of the flange 12f and female threaded for the securing bolts 19; four bearing receiving socket formations for bosses 41, 41, 41a and 41b symmetrically arranged at 90° spacing with axis at equal radial distances from the center of the member, hence from the system axis; two diametrically opposite ribs 12r running out along the inside face of flange 12f and having aligning pin receiving holes 12h, and various reinforcing ribs, namely, ribs 43 running from respective sockets radially outwardly toward the rim or flange, angular ribs 44 from the sockets into the bosses 12b and ribs 45 between adjacent sockets. The boss 41b and a corresponding boss 46 on the outer face of the member 12 or wall 12a form the walls of a socket for receiving the output shaft supporting ball bearing 50 pressed onto the output shaft and secured between a counterbore shoulder and a split spring metal C-ring 51 received in an internal groove in 46.

Thus again the apertures 12d, the threaded bosses 12b and the axes of the sockets in member 12 are symmetrically located relative to the center of the casing member and of the system axis with a four point rotational symmetry. Accordingly, the member 12 may be selectively positioned in four rotational positions relative to the member 11c, therefor providing four different locations or orientations of the output shaft relative to the base provided by the leg 11c. At each of these positions, the bearing sockets 41, 41, 41a, and 41b and member 12 will each be in alignment with a respective one of the sockets 31 of member 11. Moreover, since the aligning pin or locating pin receiving apertures 12h are diametrically located in member 12, and the two pin apertures 11h in member 11 occur at 90° locations, at any of the four relative orientations of the two casing members one of the holes 11h will coincide with one of the holes 12h to receive the locating pin 27 and precisely position the two casing members relative to each other.

In FIG. 1 it will be noted the inner end of shaft 13 is supported in a needle bearing unit 53 pressed into the corresponding socket 31. The intermediate gear shaft 18 may be similarly supported at opposite ends by needle bearings in the respective sockets 31 and 41 of the two casing members. Of course, other suitable bearings may be used in accordance with the ordinary design considerations for the service and structure in question.

It will be evident that a considerable degree of flexibility is provided in the unit, not only for positioning of the output shaft 13 relative to the base position 11c as indicated by FIG. 5, but also in the internal gearing arrangements which are possible. The gearing train represented in FIG. 1 may be had with the relative output shaft location as well at any of the positions shown in FIG. 5, merely by disassembling from member 12 the member 11 with the shafts and associated gearing 13 and 18 retained therein; rotating the member 12 to locate shaft 13 at the desired position; placing the pin 27 in one of the holes 11h or 12h which will coincide with another; inserting the ends of the shafts 13 and 18 with suitable bearings in the sockets 31 with which they now coincide; and finally again bolting the assembly together.

Also in addition to the choice available for relative positioning of the shaft 13, a simpler arrangement could be used with the output shaft and input shaft directly geared to each other by simply substituting appropriate shafts and/or gears thereon for the desired ratio; or an even more complex arrangement could be used by including one or two additional shafts with appropriate gearing as is possible within certain limits by virtue of the remaining opposed pairs of shaft supporting sockets in the two members.

Even purely from the manufacturer's viewpoint, a gear unit casing and gear supporting arrangement such as that herein described is distinctly advantageous for a standard gearing unit, that is, a gearing unit of standard external dimensions where however, different customer requirements dictate differing locations of the output shaft relative to the base and/or different internal gearing trains; since the members 11 and 12 may be readily produced by modern tooling with all bearing sockets machined to a standard form. Then one standard form of each can be produced for stock, from which each member 11 and 12 can be selected at random, and the gearing assembled therein with any selected output shaft-to-base orientation. In similar fashion in the hands of the purchaser such a unit has greater flexibility since the orientations can readily be changed in the manner indicated.

I claim:
1. For a gearing unit having an input shaft and an output shaft with axes offset from but parallel to each other, a gearing casing structure comprising:
 a first casing member with a wall portion rotatably supporting a said input shaft extending therethrough,
 a second casing member with a wall portion rotatably supporting a said output shaft extending therethrough,
 spacing means interposed between the two wall portions and defining therewith a gearing space into which said shafts extend,
 and means securing said members to each other in spaced relation with the axes of said shafts supported parallel therein and in a selectable one of a plurality of relative positions of said members in angular sense equi-spaced about the axis of one of said shafts,
 the member through which said one shaft extends including a set of like shaft-supporting sockets equal in number to said plurality and with axes equi-spaced in radial and angular sense about the axis of said one shaft with radial spacing equal to the input-output shaft offset,
 said sockets adapted to offer support to the other of said shafts,
 the member through which the other of said shafts extends having a set of shaft-supporting sockets equal in number to the first said set including one for the said other shaft and having the same rotational and radial spacing as the first said set, at least all of the said second set except the said one socket being identical with each other,
 whereby at any of said relative positions of the members the axes of the sockets in one set are aligned with respective axes of sockets in the other set,
 thereby to afford support in both members for said other shaft and for additional shafts at all said relative positions.

2. A casing as described in claim 1, wherein said wall portions are substantially perpendicular to the shaft axes, and said spacing means comprises a continuous flange integral with and extending from the said wall of one member and engaging the other member, said flange enclosing all sockets.

3. A casing as described in claim 2, wherein a said flange is provided on both said members, and said flanges have like end portions in mutual engagement over substantially their entire peripheral extent, the engaging end portions having a degree of rotational symmetry about the axis of said one shaft at least as great as the number of said selectable positions.

4. A casing as described in claim 2, wherein the identical sockets of said second set are identical with those of the first set.

5. A casing as described in claim 3, including positioning pin and socket means including two pin sockets in the flange of one member with angular spacing equal to that of successive said positions, and a plurality of pin sockets in the other flange means at double said angular spacing, adapted to align a pair of sockets from each set for reception of said pin at each said position.

6. A casing as described in claim 1, wherein said securing means comprises a plurality of bolts each engaging said wall portions and on each member a set of like bolt-engaged formations equi-spaced in radial and angular sense about the axis of said one shaft.

7. The structure of claim 1 in combination with means providing a driving connection between said input and output shaft, the last said means including respective gear elements on said shafts within said casing structure.

8. The combination described in claim 7, including additional shaft means supported in aligned sockets of the respective members and gear means on the shaft means forming with the said gear elements a gearing train between the input and output shafts.

9. In a gearing unit having an input shaft and an output shaft with axes offset parallel to each other, the structure comprising:
 first and second members each having a wall portion and a continuous integral closed flange extending toward the other member, the flanges having abutting matching end portions whereby said members define a gearing enclosing space, a first and second said shaft rotatably supported by and extending into said space through the said wall portion respectively of said first and second member, the flange end portions of both members being coaxial with the first said shaft, the second shaft being in offset parallel relation to the first, the wall portion of the first member having a set of identical integral shaft-supporting sockets adapted to support also the said second shaft and equiangularly and equiradially spaced about the axis of the first shaft, the wall portion of the second member having a set of integral shaft-supporting sockets equal in number to the first said set including one for the said second shaft and having the same rotational and radial spacing as the first said set, at least all of the said second set except the said one socket being identical with each other, whereby the said members may be mutually oriented in any one of a plurality of relative rotational positions equal to the number of sockets in a said set with the axes of the said sockets in one member aligned with respective axes of sockets in the other member, thereby in each position to afford support in both members for said second shaft and for additional shafts at all said relative positions;

means for securing said members together in shaft supporting relation at each of said positions; and at least one said additional shaft supported between the said members.

10. The structure described in claim 9, wherein said first member includes a functional formation asymmetrically disposed relative to the axis of the said first shaft.

11. The structure described in claim 9 wherein said first member includes a base formation at a location offset from said shaft.

12. The structure described in claim 11 in combination with an electric motor structure, wherein the first said shaft is the shaft of the motor rotor and the first said member forms a rotor shaft supporting end bracket of the motor.

References Cited by the Examiner

UNITED STATES PATENTS

| | | | |
|---|---|---|---|
| 2,623,406 | 12/1952 | Hansen | 74—606 |
| 2,832,229 | 4/1958 | Rieser | 74—606 |
| 3,009,366 | 11/1961 | Roberts | 74—606 |
| 3,011,358 | 12/1961 | Moore | 74—606 |
| 3,073,176 | 1/1963 | Daugirdas | 74—397 |

MILTON KAUFMAN, *Primary Examiner.*

BROUGHTON G. DURHAM, *Examiner.*

W. S. RATLIFF, *Assistant Examiner.*